US009261642B2

(12) United States Patent
Wang

(10) Patent No.: US 9,261,642 B2
(45) Date of Patent: Feb. 16, 2016

(54) LIGHT GUIDE MEMBER AND DISPLAY DEVICE

(71) Applicant: BOE Technology Group Co., Ltd., Beijing (CN)

(72) Inventor: Shang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 3 days.

(21) Appl. No.: 14/313,072

(22) Filed: Jun. 24, 2014

(65) Prior Publication Data

US 2015/0309246 A1    Oct. 29, 2015

(30) Foreign Application Priority Data

Apr. 24, 2014  (CN) .......................... 2014 1 0169247

(51) Int. Cl.
*F21V 7/04*      (2006.01)
*F21V 8/00*      (2006.01)

(52) U.S. Cl.
CPC ............ *G02B 6/0078* (2013.01); *G02B 6/0041* (2013.01); *G02B 6/0051* (2013.01); *G02B 6/0055* (2013.01); *G02B 6/0065* (2013.01)

(58) Field of Classification Search
CPC .. G02B 6/0001; G02B 6/0011; G02B 6/0075; G02B 6/0076; G02B 6/0078; G02B 6/0041; G02B 6/0051; G02B 6/0065
See application file for complete search history.

(56) References Cited

U.S. PATENT DOCUMENTS

| | | | |
|---|---|---|---|
| 8,740,440 B2 * | 6/2014 | Mizuno et al. ................ | 362/613 |
| 2002/0141173 A1 * | 10/2002 | Lee et al. ......................... | 362/26 |
| 2009/0167990 A1 * | 7/2009 | Konno et al. .................... | 349/65 |
| 2011/0176329 A1 * | 7/2011 | Lin et al. ........................ | 362/607 |
| 2011/0279426 A1 * | 11/2011 | Imamura et al. ............... | 345/207 |
| 2012/0159825 A1 * | 6/2012 | Pitcher et al. ................... | 40/735 |
| 2013/0100700 A1 * | 4/2013 | Kubo ............................. | 362/611 |
| 2014/0036538 A1 * | 2/2014 | You et al. ....................... | 362/613 |

* cited by examiner

*Primary Examiner* — Y M Lee
(74) *Attorney, Agent, or Firm* — Westman, Champlin & Koehler, P.A.

(57) ABSTRACT

The present invention relates to a light guide member. The light guide member comprises a plurality of light guide sheets each including: a body having a curved shape; a plurality of scattering particulates dispersed in the body; a light exiting layer positioned on an outer surface of the body; and a light reflecting layer positioned on an inner surface of the body. Each of the light guide sheets has two end surfaces and two side surfaces, and at least one of the two end surfaces is used to guide light into each of the light guide sheets. The light guide member is formed by the plurality of light guide sheet connected side by side through the side surfaces.

9 Claims, 6 Drawing Sheets

LIGHT GUIDE MEMBER AND DISPLAY DEVICE

CROSS-REFERENCE TO RELATED APPLICATION

This application claims the benefit of Chinese Patent Application No. 201410169247.6 filed on Apr. 24, 2014 in the State Intellectual Property Office of China, the whole disclosure of which is incorporated herein by reference.

BACKGROUND OF THE INVENTION

1. Field of the Invention

The present invention relates to a display device, and more particularly to a light guide member and a display device including the light guide member.

2. Description of the Related Art

Currently, large screen display devices are widely used in public squares, stadiums, meeting rooms and the like. Due to limited area of a single display panel, current larger screen display device are usually formed by connecting a plurality of display panels such as liquid crystal display panels or plasma display panels, thereby the size of screen is increased.

Usually, in order to fix and protect the display panel of the large screen display device, a frame is disposed between adjacent display panels. However, since the frame cannot be used to display, a dark area is generated at the position of the frame between the adjacent display panels, which may cause a large difference in light intensity between a frame area and a display area, and thus adversely affects the performance of display.

SUMMARY OF THE INVENTION

The present invention has been made to overcome or alleviate at least one aspect of the above mentioned disadvantages.

According to one embodiment of the present invention, a light guide member is provided. The light guide member comprises a plurality of light guide sheets each including: a body having a curved shape; a plurality of scattering particulates dispersed in the body; a light exiting layer positioned on an outer surface of the body; and a light reflecting layer positioned on an inner surface of the body. Each of the light guide sheets has two end surfaces and two side surfaces, and at least one of the two end surfaces is used to guide light into each of the light guide sheets. The light guide member is formed by the plurality of light guide sheet connected side by side through the side surfaces.

According to another embodiment of the present invention, a display device is provided. The display device comprises a plurality of display panels connected together, a frame to connect the plurality of display panels, and at least one light guide member disposed above the frame between adjacent display panels. The light guide member comprises a plurality of light guide sheets and each light guide sheet includes: a body having a curved shape; a plurality of scattering particulates dispersed in the body; a light exiting layer positioned on an outer surface of the body; and a light reflecting layer positioned on an inner surface of the body. Each of the light guide sheets has two end surfaces and two side surfaces, and at least one of the two end surfaces is used to guide light into each of the light guide sheets. The light guide member is formed by the plurality of light guide sheet connected side by side through the side surfaces. The two end surfaces of each of the light guide sheets are positioned at both sides of the frame and contact display areas of adjacent display panels, respectively.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
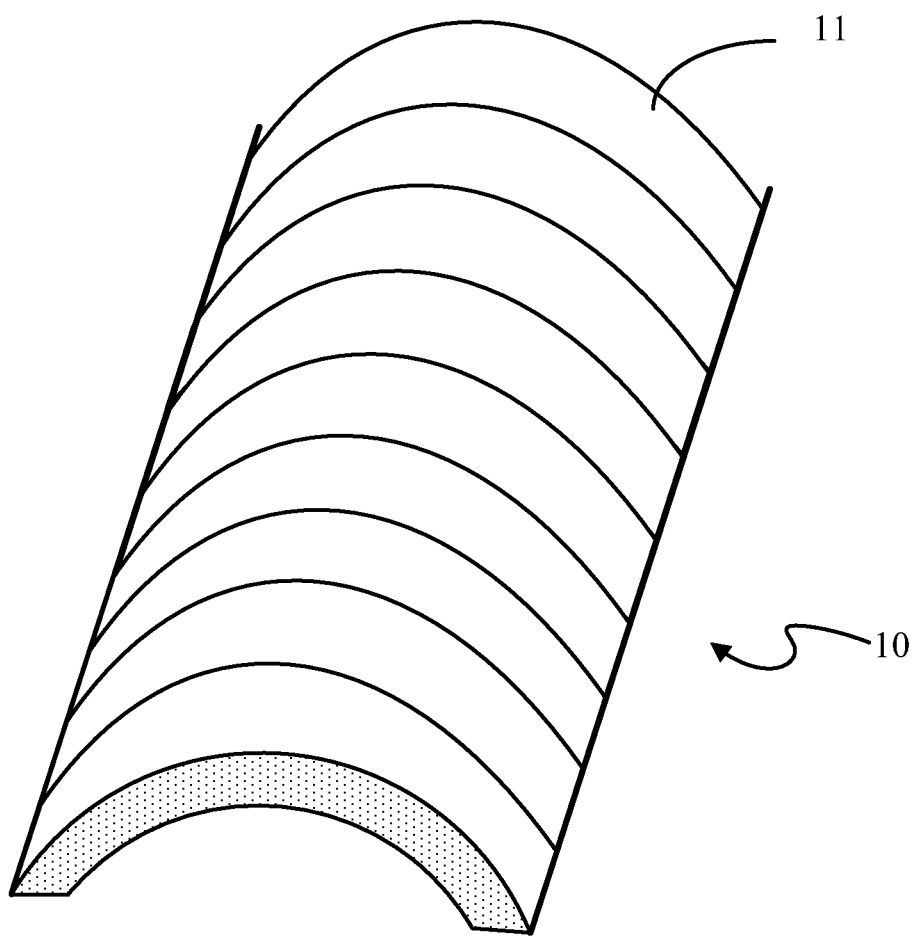
FIG. 1 is a schematic perspective view showing a light guide member according to a first embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
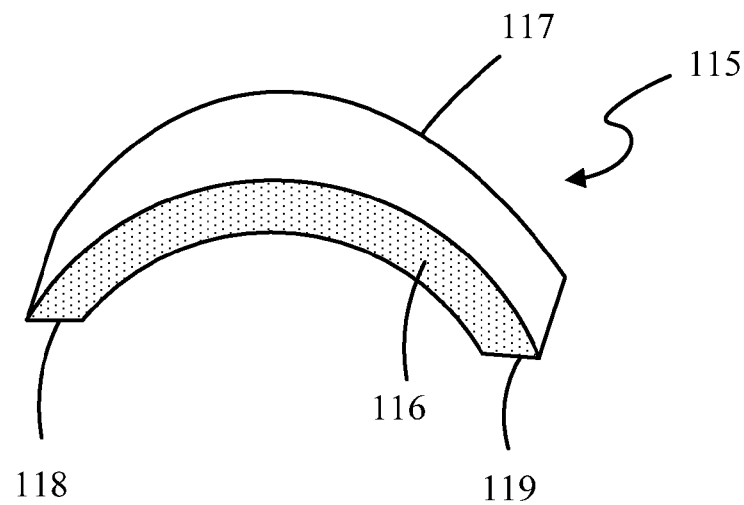
FIG. 2 is a schematic structural view showing a body of a light guide sheet of the light guide member in FIG. 1.
Figure 3:
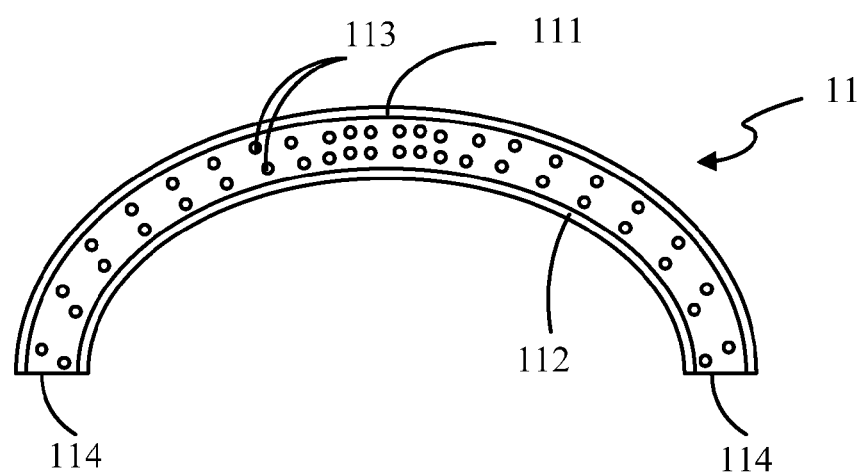
FIG. 3 is a schematic cross-section view of the light guide sheet of the light guide member in FIGS. 1 and 2.

FIGS. 1 to 3 are schematic views of a light guide member according to a first embodiment of the present invention. FIG. 1 shows a schematic view of the light guide member according to the first embodiment, FIG. 2 shows a body of a light guide sheet of the light guide member, and FIG. 3 is a cross-sectional view of the guide sheet showing particulates dispersed therein.

As shown in FIG. 1, the light guide member 10 comprises a plurality of light guide sheet 11. Referring to FIGS. 2 and 3, each light guide sheet 11 includes a body 115 and scattering particles 113 dispersed in the body 115. The body 115 of each light guide sheet has a curve shape and includes: a light exiting layer 111 positioned on an outer surface of the body 115 that faces users; a light reflecting layer 112 positioned on an inner surface of the body 115 opposite to the outer surface; two end surfaces 118, 119; and two side surfaces 116, 117 opposite to each other.

The plurality of light guide sheets are connected to each other side by side through their side surfaces. Referring to FIG. 1, the side surface 116 of a previous light guide sheet 11 is connected with the side surface 117 of a next light guide sheet 11, so as to connect the plurality of light guide sheets in serials into a strip.

In one embodiment of the present invention, the end surfaces 118, 119 are perpendicular to the side surfaces 116, 117, the side surfaces 116, 117 are parallel with each other, and the end surfaces 118, 119 are in the same plane. In other embodiment of the present application, the orientation of each end surface and each side surface may be changed. For example, the side surface 116 may not parallel to the side surface 117, as long as adjacent light guide sheets 11 could be connected together to form a straight stripe. For example, the body 11 of each light guide sheet 11 may have a wedge shape and the adjacent light guide sheets 11 are orientated toward opposite directions, such that the light guide sheets could be connected together to form a straight strip. Further, the end surface 118 may be located in a different plane from the end surface 119, as long as the end surfaces could cooperate with display areas of display panels and guide the light from the display panels into the light guide sheet. In the present embodiment, at least one of the end surfaces 118, 119 serves as a light incidence surface 114.

In this embodiment of the present invention, the light guide member 10 is consisted of the plurality of light guide sheets 11 having curved shapes, and the plurality of light guide sheets 11 may be held in place by any suitable supporting or snap-fitting means. When the light guide member 10 is placed above a frame by which the adjacent display panel are connected together, the end surfaces 118, 119 will contact the display areas of the display panels to guide the light emitted from the display areas into the light guide sheet, then incident light exits through the light exiting layer 111 after being scattered by the scattering particles 113, thus reducing difference in light intensity between the position of the frame and the display areas of the display panels. And at the same time, the light reflecting layer 112 reflects the incident light, thereby improving utilization of the incident light. It is noted that the side surfaces 116, 117 may also used for transmitting the light, so that light may also pass through the end surfaces.

Figure 4:
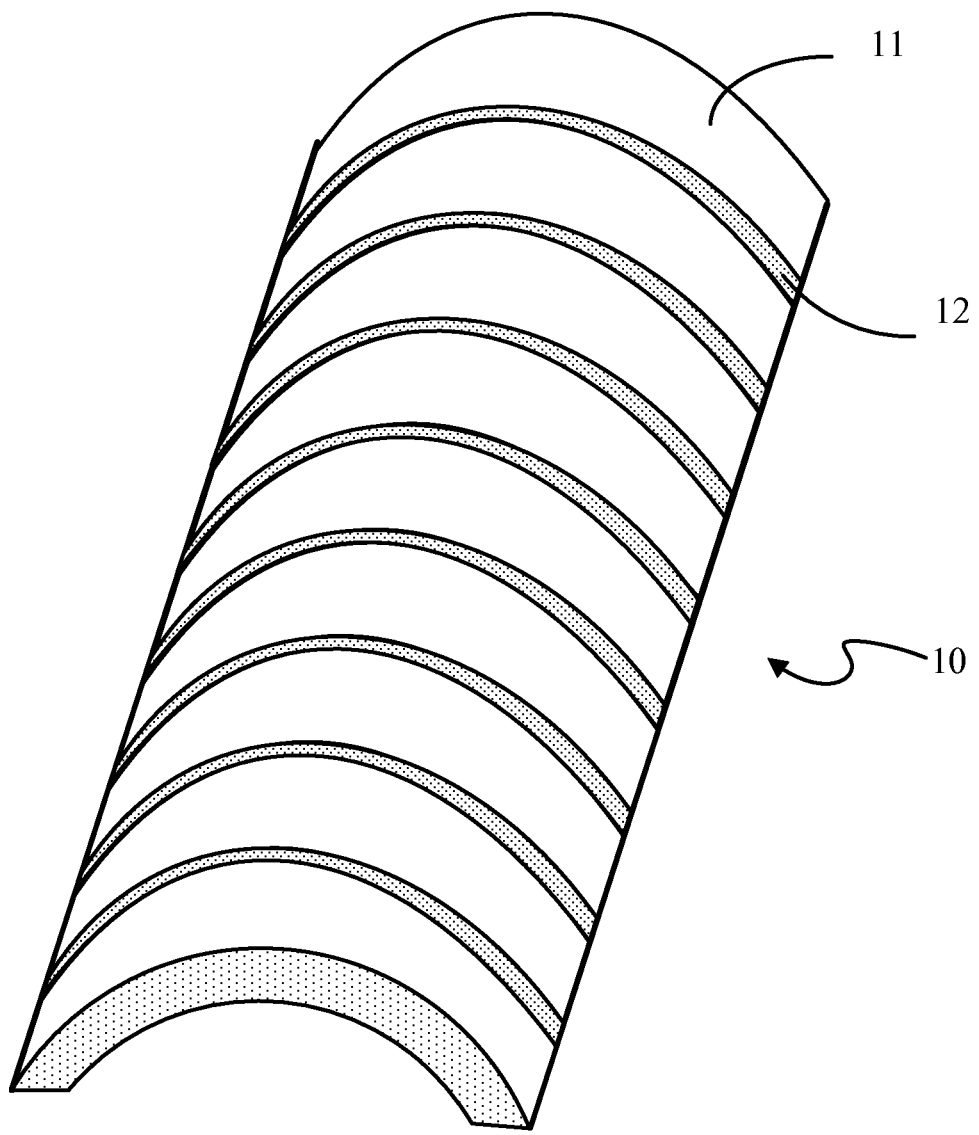
FIG. 4 is a schematic perspective view showing a light guide member according to a second embodiment of the present invention.

FIG. 4 shows a light guide member 10 according to a second embodiment of the present invention. The light guide member 10 shown in FIG. 4 differs from that shown in FIG. 1 in that the light guide member 10 further comprises a plurality of adhesive layers 12 each of which is disposed between side surfaces of adjacent light guide sheets 11. In the present embodiment, adjacent light guides 11 are bonded together by the adhesive layers 12 to improve strength of the light guide member 10.

Figure 5:
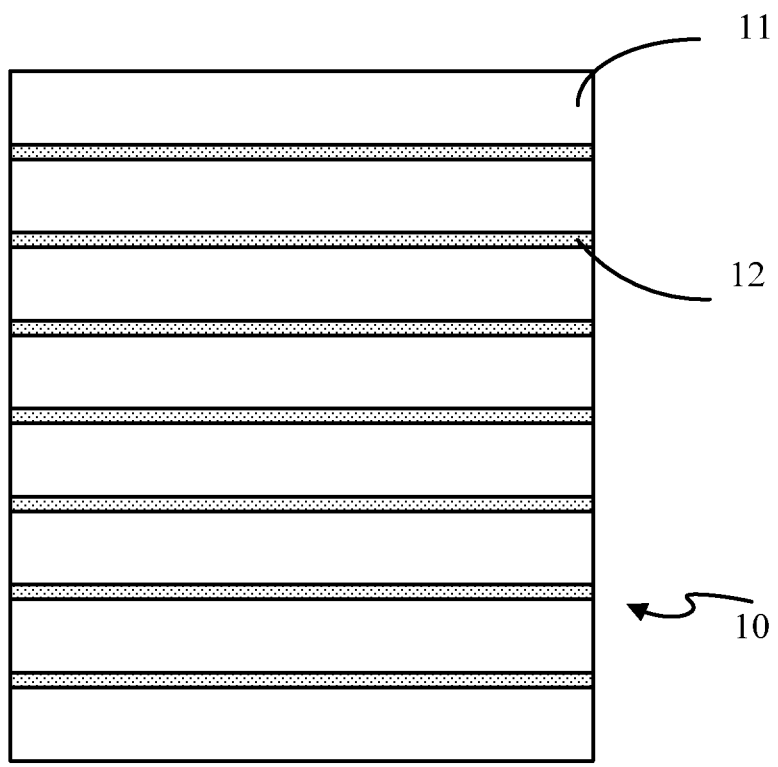
FIG. 5 is a schematic top view of the light guide member in FIG. 2.
Figure 6:
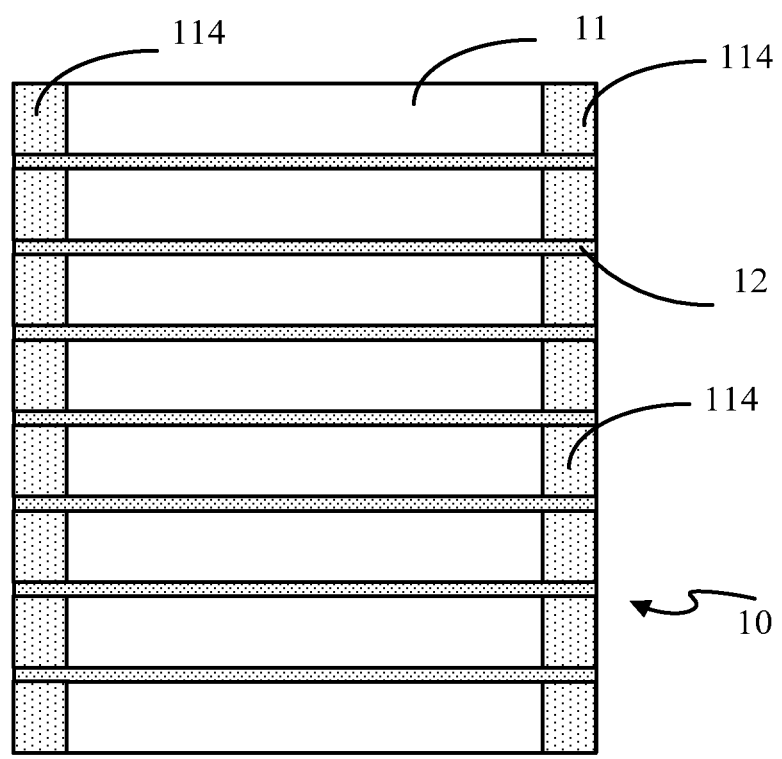
FIG. 6 is a schematic bottom view of the light guide member in FIG. 2.

FIGS. 5 and 6 show schematic top and bottom views of the light guide members 10 according to the second embodiment of the present invention. The arrangement and connection relationship of the light guide sheets 11 are shown in details in FIGS. 5 and 6. Either one or both of end surfaces 118, 119 could be used as the light incidence surface 114 of the light guide sheet 11.

In a further embodiment of the present invention, the material of the adhesive layer 12 may comprise an optical adhesive. An optical adhesive having low refractive index may be selected to reduce impact on the light when transmitting between the connected adjacent light guide sheets 11.

In a still further embodiment of the present invention, both end surfaces may be located in a same plane or in different planes. In the present invention, the configuration (e.g. orientation) of both ends surfaces may be preset to for different situations (e.g. different shapes of surfaces of display area).

In a yet further embodiment of the present invention, the body 115 of each light guide sheet may be of an arc shape or a free-curved shape.

In a still further embodiment of the present invention, the distribution density of the scattering particulates 113 in the body 115 is set in a manner that the density gradually increases from an edge to a centre area of the body 115 of each light guide sheet 11 as shown in FIG. 3. The light intensity of the exit light is uniformized by distributing the scattering particulates 113 in such a manner.

In a yet further embodiment of the present invention, the scattering particulates 113 may comprise $SiO_2$ particulates. The size of the $SiO_2$ particulates may be determined according to actual situation. In the present embodiment, the scattering particulates 113 is in the form of $SiO_2$ particulates that are easy to manufacture and cost-saving, and scattering effect could be improved at the same time.

In a still further embodiment of the present invention, the material of the body 115 of the light guide sheet 11 may be any one of polymethyl methacrylate (PMMA), polycarbonate (PC), and polyethylene terephthalate (PET). Of course, other transparent materials may also be used. In the present embodiment, material of the light guide sheet comprises macromolecule transparent material which has advantages in incidence and exit of light.

In a yet further embodiment of the present invention, the light reflecting layer 112 comprises a silver coating or an aluminum coating. In the present embodiment, the light reflecting layer 112 could be formed from a commonly used coating material, such that the layer could be formed easily and cost-saving.

In a still further embodiment of the present invention, the light exiting layer 111 comprises a film formed form a transparent optical materials. Alternatively, the light exiting layer 111 comprises a frosted finish layer formed on an upper surface of the body 115 of the light guide sheet. In the present embodiment, the light exiting layer 111 is formed from a commonly used coating material and through a commonly used process, so as to simplify the process and reduce costs.

In an embodiment of the present invention, the plurality of light guide sheets 11 that form the light guide member 10 have the same curved shape. When the light guide member 10 is placed above the frame by which adjacent display panel are connected together, both end surfaces of each light guide sheet will contact the display areas of the display panels to guide the light from the display area into the light guide sheet, then the incident light exits through the light exiting layer 111 after being scattered by the scattering particles 113 which are dispersed in a manner that the distribution density gradually changes, so that difference in light intensity between the position of the frame and the display areas of the display panels is reduced and light intensity is uniformized. Furthermore, the light reflecting layer 112 reflects the incident light, thereby improving utilization of the incident light.

Figure 7:
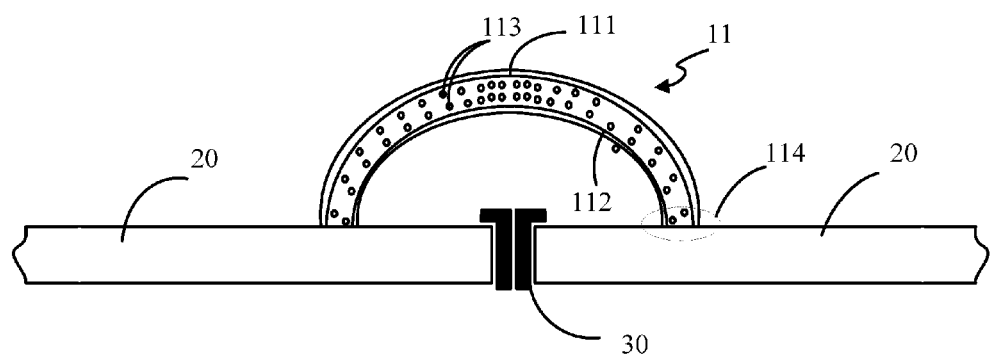
FIG. 7 is a schematic partial cut-away view of a large screen display device according to an embodiment of the present invention, showing a light guide member positioned above a frame connecting adjacent display panels.

FIG. 7 is a partially cut-away section view showing a large screen display device according to an embodiment of the present invention with a light guide member positioned above a frame connecting adjacent display panels. The display device comprises a plurality of display panels 20 which are connected together by a frame 30, and a light guide member 10 as described above. The light guide member 10 is disposed above the frame 30 between adjacent display panels 20. Both end surfaces of each light guide sheet 11 of the light guide member 10 are positioned on both sides of the frame and contact the display areas of the adjacent display panels respectively.

In an embodiment of the present invention, the light guide member 10 is disposed above a frame by which adjacent guide light display panels of a display device are connected together. The light guide member 10 is consisted of a plurality of light guide sheets 11 having curved shapes. Light incidence surfaces of each light guide sheets 11 contacts the display areas of the display panels 20 to guide light from the display area of the display panel, then incident light exits through the light exiting layer 111 after being scattered by the scattering particles 113 dispersed in a manner that the distribution density of the particles is gradually changed in the body of light guide sheet, so that the difference in light intensity between the position of the frame and the display areas of the display panels is reduced and light intensity is uniformized. Further, the light reflecting layer 112 reflects the incident light, thereby improving utilization of the incident light.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display device comprises:
   a plurality of display panels that are connected together,
   a frame to connect the plurality of display panels, and
   at least one light guide member disposed above the frame between adjacent display panels, the light guide member comprising a plurality of light guide sheets, each light guide sheet comprising:
   a body having a curved shape;
   a plurality of scattering particulates dispersed in the body;
   a light exiting layer positioned on an outer surface of the body; and
   a light reflecting layer positioned on an inner surface of the body,
   wherein each light guide sheet further comprises two end surfaces and two side surfaces, and at least one of the two end surfaces is used to guide light into the light guide sheets;
   wherein the light guide member is formed by the plurality of light guide sheet connected side by side through the side surfaces, and
   wherein the two end surfaces of each light guide sheet are positioned at two sides of the frame and contact display areas of adjacent display panels, respectively.

2. The display device according to claim 1, wherein the light guide member further comprises a plurality adhesive layers, each of the adhesive layers being disposed between the side surfaces of adjacent light guide sheets respectively.

3. The display device according to claim 2, wherein the material of the adhesive layer comprises an optical adhesive.

4. The display device according to claim 1, wherein the body of each light guide sheet is of an arc shape or a free-curved shape.

5. The display device according to claim 4, wherein the scattering particulates are dispersed in the body in a manner that the distribution density gradually increases from an edge to a centre area of the body of light guide sheet when the body of the light guide sheet is of an arc shape.

6. The display device according to claim 1, wherein the scattering particulates comprise $SiO_2$ particulates.

7. The display device according to claim 1, wherein the material of the body of the light guide sheet comprises any one of polymethyl methacrylate, polycarbonate and polyethylene terephthalate.

8. The display device according to claim 1, wherein the light reflecting layer comprises a silver coating or an aluminum coating.

9. The light guide member according to claim 1, wherein the light exiting layer comprises transparent optical coating or a frosted finish layer formed on the outer surface of the body of the light guide sheet.

* * * * *